United States Patent [19]

Ross et al.

[11] 4,242,722
[45] Dec. 30, 1980

[54] CAPACITOR CONTAINING ANTHRANILATE ELECTROLYTE

[75] Inventors: Sidney D. Ross, Williamstown; Manuel Finkelstein, North Adams; Franz S. Dunkl, Williamstown, all of Mass.

[73] Assignee: Sprague Electric Company, North Adams, Mass.

[21] Appl. No.: 22,553

[22] Filed: Mar. 21, 1979

[51] Int. Cl.³ .......................................... H01G 9/02
[52] U.S. Cl. .................................. 361/433; 252/62.2; 29/570
[58] Field of Search ..................... 252/62.2; 361/433; 29/570

[56] References Cited

U.S. PATENT DOCUMENTS

| | | | |
|---|---|---|---|
| 2,024,210 | 12/1935 | Edelman | 252/62.2 X |
| 2,227,146 | 12/1940 | Linder | 361/433 X |
| 3,931,552 | 1/1976 | Anderson | 252/62.2 X |
| 4,021,470 | 5/1977 | Braid . | |

OTHER PUBLICATIONS

Lipshtein et al., "Chem. Abs.", 82, 1975, 33053 R.
McMaster et al., "J. Amer. Chem. Soc.", 37, pp. 281-288, 1915.

Primary Examiner—Jack Cooper
Attorney, Agent, or Firm—Connolly and Hutz

[57] ABSTRACT

An electrolytic capacitor contains an electrolyte of ammonium anthranilate dissolved in a polar organic solvent.

2 Claims, 2 Drawing Figures

U.S. Patent            Dec. 30, 1980            4,242,722
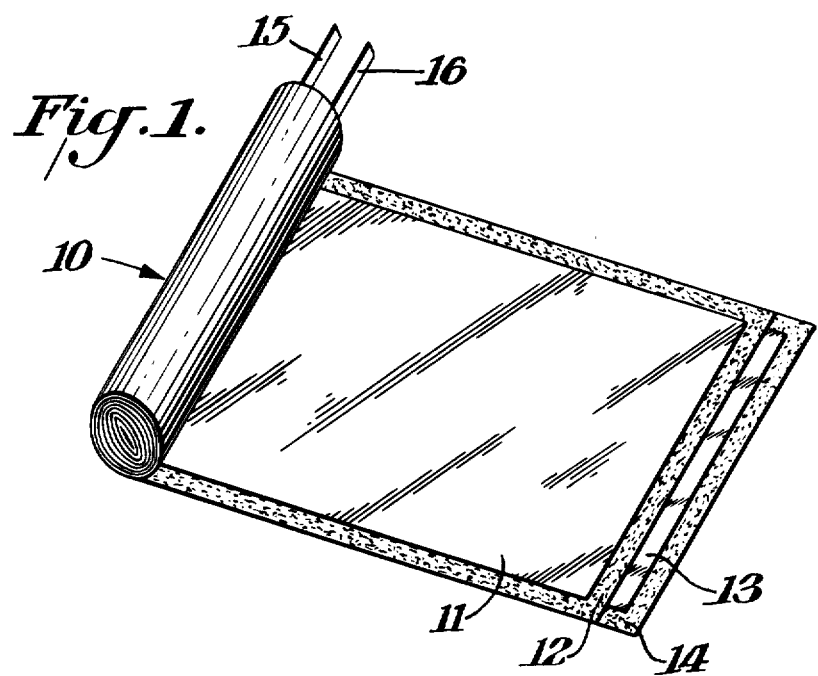
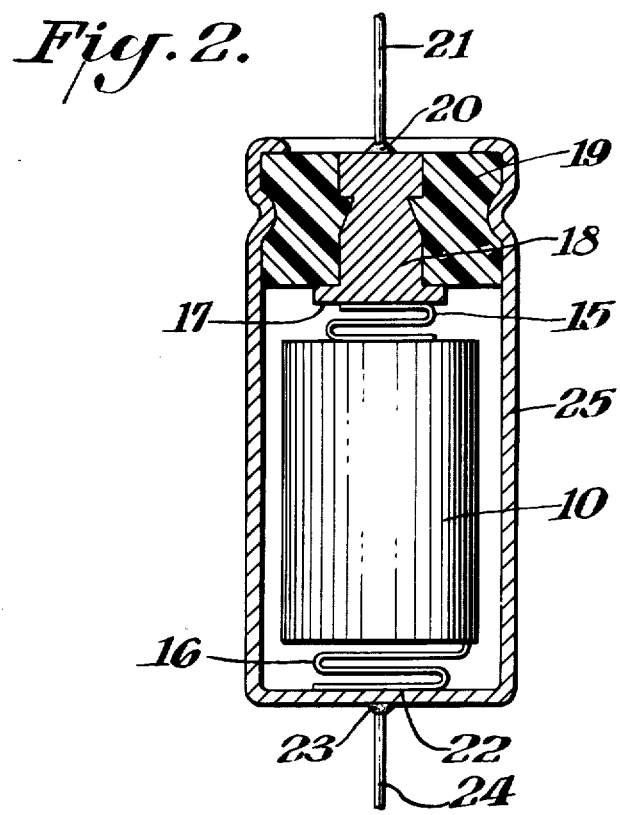

CAPACITOR CONTAINING ANTHRANILATE ELECTROLYTE

BACKGROUND OF THE INVENTION

This invention relates to electrolytic capacitors and specifically to those utilizing an ammonium or amine anthranilate dissolved in a polar organic solvent as electrolyte.

There is commerical need for capacitors which can operate below 0° C. and/or above 100° C., the freezing and boiling points of water, the commonest polar solvent. Thus, electrolytic capacitors today generally use polar organic solvents which have freezing and/or boiling points suitable for the particular capacitor use as well as acceptable conductivities over the range of contemplated use. These properties will, of course, be altered by the nature of the solute. The final electrolyte needs to be stable over the temperature range of operation; not only must it not boil or freeze, but its resistivity should not change significantly over the operating temperature range. It must be capable of anodizing the metal used as anode in order to heal any imperfections or breaks in the dielectric on the anode.

Glycol borate electrolytes are standard in the industry for use above 0° C. However, at temperatures close to 100° C., these electrolytes react via condensation and esterification to give glycol polyborates and water. This reaction limits the use of capacitors containing such electrolytes to maximum temperatures below 100° C. and commonly to about 85° C.

Therefore, for use at about 100° C. or above, other solutes and/or other solvents must be employed. Some of these combinations are not as preferable as others for reasons other than stated above, e.g., manufacturing considerations including such factors as cost, ease of handling, materials interaction leading to sealing problems and leaks, etc.

SUMMARY OF THE INVENTION

It is an object of this invention to provide a capacitor containing an electrolyte that is thermally stable with good temperature-resistivity characteristics over a wide range.

A more specific purpose is to provide capacitors containing electrolytes that are capable of sustained operation at 200 V between 0° C. and 120° C.

Still further, this invention provides a glycol-based electrolyte with improved high temperature properties.

These purposes can be met through the use of electrolytes in which ammonium anthranilate is dissolved in a polar organic solvent. Such a polar solvent may be chosen from conventional capacitor solvents or solvent mixtures including lactones, carbamates, polyhydric alcohols, alcohol-ethers, nitriles, amides, sulfoxides, etc. Specific solvents in each of the above groups would be butyrolactone, 3-ethyl-2-oxazolidone, ethylene glycol, cellosolve, methylcarbitol, 3-methoxypropionitrile, N,N-dimethylformamide, dimethylsulfoxide, and mixtures thereof.

The electrolyte in the capacitor usually contains some water. This water may be part of the electrolyte formulation or/and it may arise from the spacer materials used. For example, paper used in wound foil capacitors may contain up to 3% water. When aluminum is the valve-metal used as the electrode material, experience and experiments show that at least about 1 wt% water must be present for the reformation of the aluminum anode. Water is also present to adjust resistivity and viscosity. Generally 10 wt% water is the upper limit for capacitors of the type described herein. Thus, it may be necessary to add water to the capacitor electrolyte depending on how much, if any, moisture is present in the spacer material used and on electrode material used in the capacitor, and preferably 1–10 wt% water is present.

If the ammonium anthranilate is prepared from commercial anthranilic acid, the latter should be purified, e.g., be recrystallization, to make sure it is free from chloride ion.

BRIEF DESCRIPTION OF THE DRAWING

FIG. 1 shows a wound capacitor section partially unrolled.

FIG. 2 is a cross-section of a capacitor containing a wound section.

Referring to FIG. 1, wound capacitor section 10 consists of anode foil 11 of a valve metal, preferably aluminum, having on its surface an insulating oxide barrier layer. Cathode foil 13 may also be a valve metal. Electrolyte absorbent films 12 and 14, preferably paper, are positioned between the anode and cathode foils. Tabs 15 and 16 are connected to electrodes 11 and 13, respectively, to provide for connection of the electrodes to leads. When completely wound, section 10 is impregnated with electrolyte (not shown).

FIG. 2 shows a cross-section of an axial capacitor in which the cathode tab 16 of capacitor section 10 is welded at 22 to the bottom of container 25 and it in turn is welded at 23 to cathode lead 24. Anode tab 15 is welded to the bottom portion 17 of plug 18 positioned in bushing 19, and welded at 20 to anode lead 21. Electrolyte (not shown) impregnates section 10.

DESCRIPTION OF THE PREFERRED EMBODIMENTS

Since, in general, there is some parallelism between resistivity and maximum anodization capability for an electrolyte formulation and since resistivity is an easier measurement to make, resistivities are used as a measure of electrolyte suitability. For example, capacitors for use in power supplies are manufactured with electrolytes having resistivities of 500–600 Ω-cm and capable of continuous operation at 200 V and from 0° C. to 115° C.

In each of the following electrolytes, the solute is ammonium anthranilate. By increasing or decreasing its concentration or by changing the polar organic solvent or solvent mixture, electrolytes with room temperature resistivities of about 250 Ω-cm to about 1200 Ω-cm can be obtained.

EXAMPLE 1

This example shows the stability of ammonium anthranilate in ethylene glycol upon heating. The solution consisted of 10 g of ammonium anthranilate dissolved in a mixture of 100 ml ethylene glycol and 4 ml of water. It had a room-temperature resistivity of 459 Ω-cm, and this remained unchanged after 70 hr of heating at 88° C. in a sealed tube. Thus, the solute remained stable and did not react to form anthranilamide, a nonconducting species. Another portion was heated for 84 hr at 90° C. in the presence of phosphate-passivated aluminum cathode foil; the resistivity did not change significantly and neither did the passivation of the foil change, as determined by phosphate probe and analysis of the foil before and after the heating.

EXAMPLE 2

This example shows the effect of varying solute concentration and solvents on the room temperature resistivity of the electrolyte. The composition is given in wt% and the resistivity in Ω-cm, measured at 25° C.

TABLE 1

|    | Ammonium Anthranilate | Glycol | Butyrolactone | Water | Resistivity |
|----|----|----|----|----|----|
| 1. | 8.0 | 88.9 | 0 | 3.1 | 459 |
| 2. | 6.5 | 90.2 | 0 | 3.2 | 542 |
| 3. | 6.1 | 67.8 | 22.9 | 3.2 | 459 |
| 4. | 14.7 | 41.0 | 41.4 | 2.9 | 254 |
| 5. | 11.4 | 42.5 | 43.0 | 3.1 | 286 |
| 6. | 4.1 | 46.0 | 46.5 | 3.4 | 467 |
| 7. | 14.6 | 8.2 | 74.3 | 2.9 | 584 |
| 8. | 14.6 | 0 | 82.5 | 2.9 | 980 |

Formulations 1 and 2 and 4–6 show the effect of varying solute concentration in the same solvent or solvent mixture. Generally, lower concentrations of solute give higher resistivities. Examples 4, 7, and 8 show the effect on resistivity of varying solvent composition holding solute concentration constant and indicates a much wider variation in resistivity. Finally, the hydrogen-bonding donor-acceptor solvent pair shows another way of varying resistivity.

In Table 2, the effect of varying solvent composition is shown for varying amounts of ethylene glycol and dimethylsulfoxide. All of these formulations contained the same amount of solute and water, although the weight percentages vary because of the different weights of solvent. The resistivity is in Ω-cm at 25° C.

TABLE 2

|    | Ammonium Anthranilate | Glycol | Dimethylsulfoxide | Water | Resistivity |
|----|----|----|----|----|----|
| 9. | 14.64 | 81.71 | 0 | 3.66 | 320 |
| 10. | 14.70 | 57.38 | 24.25 | 3.67 | 310 |
| 11. | 14.72 | 49.23 | 32.38 | 3.68 | 300 |
| 12. | 14.73 | 41.09 | 40.50 | 3.68 | 304 |
| 13. | 14.75 | 32.89 | 48.67 | 3.69 | 312 |
| 14. | 14.76 | 24.74 | 56.83 | 3.69 | 352 |
| 15. | 14.81 | 0 | 81.48 | 3.70 | 624 |

It can be seen more clearly that a minimum resistivity can be obtained by varying the relative proportions of the solvents for a given amount of solute and water.

EXAMPLE 3

The use of ammonium anthranilate with various polar solvents or solvent mixtures is shown below. Resistivity is in Ω-cm at the temperatures noted. The composition data are in wt%.

| Formulation 16 | wt % | 17 | wt % |
|---|---|---|---|
| Ammonium Anthranilate | 15.9 | Ammonium Anthranilate | 15.3 |
| Water | 3.2 | Methyl Carbitol | 39.0 |
| Methyl Carbitol | 80.9 | Glycol | 42.6 |
| Resistivity, 24° C. | 959Ω-cm | Water | 3.1 |
|  |  | Resistivity 24° C. | 417Ω-cm |

| 18 | wt % | 19 | wt % |
|---|---|---|---|
| Ammonium Anthranilate | 15.2 | Ammonium Anthranilate | 16.7 |
| Methyl Carbitol | 38.9 | N,N-dimethyl-formamide | 79.1 |
| Butyrolactone | 42.9 | Water | 4.2 |
| Water | 3.0 | Resistivity 25° C. | 521Ω-cm |
| Resistivity 24° C. | 892Ω-cm |  |  |

| 20 |  | 21 |  |
|---|---|---|---|
| Ammonium Anthranilate | 15.7 | Ammonium Anthranilate | 5.5 |
| N,N-dimethyl-formamide | 37.2 | 3-ethyl-2-oxazolidone | 61.1 |
| Glycol | 44.0 | Glycol | 30.7 |
| Water | 3.1 | Water | 2.7 |
| Resistivity, 23° C. | 277Ω-cm | Resistivity, 25° C. | 352Ω-cm |

| 22 |  | 23 |  |
|---|---|---|---|
| Ammonium Anthranilate | 14.7 | Ammonium Anthranilate | 7.9 |
| Glycol | 40.9 | 3-ethyl-2-oxazolidone | 43.7 |
| 3-ethyl-2-oxazolidone | 40.7 | Butyrolacetone | 44.4 |
| Water | 3.7 | Water | 4.0 |
| Resistivity, 25° C. | 352Ω-cm | Resistivity, 25° C. | 1160Ω-cm |

| 24 |  | 25 |  |
|---|---|---|---|
| Ammonium Anthranilate | 11.5 | Ammonium Anthranilate | 16.6 |
| Glycol | 42.8 | Methyl Cellosolve | 80.1 |
| 3-ethyl-2-oxazolidone | 42.6 | Water | 3.3 |
| Water | 3.1 | Resistivity, 23° C. | 381Ω-cm |
| Resistivity, 25° C. | 370.5Ω-cm |  |  |

| 26 |  |
|---|---|
| Ammonium Anthranilate | 11.5 |
| 3-methoxypropionitrile | 54.0 |
| Glycol | 32.2 |
| Water | 2.3 |
| Resistivity, 23° C. | 457Ω-cm |

As before, resistivity varies with amount of solute, solvent, and type of solvent mixture.

EXAMPLE 4

As mentioned before there is a general parallelism between resistivity and maximum anodization voltage. In general, lowering the resistivity lowers the maximum anodization voltage. As also mentioned before, resistivity is a relatively simple measurement and is generally used to evaluate electrolyte formulations. This example shows the resistivity and maximum anodization voltage for aluminum anodes for three of the formulations.

| Formulation | Resistivity | Max. Anodization voltage |
|---|---|---|
| 1 | 459Ω-cm | 290 V |
| 2 | 542Ω-cm | 350 V |
| 24 | 370.5Ω-cm | 238 V |

This example presents the average results of ripple life tests carried out at 85° C., 200 VDC and 4.5 amp 60 HZ AC. The units were rated at 1000 μF, 200 V and were made with aluminum foil and two layers 0.001 inch Benares paper as spacer. The electrolyte contained 6.47 wt% ammonium anthranilate, 3.33 wt% water, and 90.28 wt% ethylene glycol and had a resistivity of 513 Ω-cm at 25° C.

|  | Capacitance, μF | Dissipation Factor | DC leakage, mA |
|---|---|---|---|
| 0 hr | 1097 | 0.066 | 0.32 |
| 500 hr | 1078 | 0.081 | 0.11 |

The electrolyte remained stable and shows possibility for use in AC capacitors based on the ripple life tests as, since it withstood 4.5 amp at constant load, it could withstand multiples of that for short times (60 surges/hr), typical of AC capacitor usage.

EXAMPLE 6

A variety of amine salts of anthranilic acid were prepared to evaluate the usefulness of amine salts generally as solutes for capacitor electrolytes. It was found that salts formed with primary, secondary, and tertiary amines. Representatives results are set forth below. A 96% ethylene glycol-4% water solvent was used throughout.

TABLE 3

| Salt | Resistivity, Ω-cm, 25° C. | Max. formation voltage, 25° C. |
|---|---|---|
| Diisopropylammonium salt (11.4 wt %) | 1182 | — |
| 2-hydroxyethylammonium salt (17.7 wt %) | 546 | 178 |
| triethylammonium salt (15.9 wt %) | 1182 | — |//
| morpholinium salt (14.5 wt %) | 696 | 227 |
| N-methylmorpholinium salt (32 wt %) | 781 | 205 |
| triethylene diammonium salt (22 wt %) | 870 | 192 |
| piperidinium salt (20.5 wt %) | 638 | 245 |

The above formation voltages are for aluminum foil. However, the capacitor may be a tantalum one, especially one with an aluminum cathode where electrolyte compatibility with aluminum is particularly important. This compatability is important with tantalum-tantalum capacitors also as the case is generally made of aluminum.

What is claimed is:

1. An electrolytic capacitor comprising a formed anode electrode, a cathode electrode, interleaved spacers therebetween, and as liquid electrolyte in contact therewith, 4.1 to 15.7 wt% of ammonium anthranilate dissolved in a polar organic solvent selected from the group consisting of ethylene glycol and ethylene glycol mixed with butyrolactone, methyl carbitol, N,N-dimethylformamide, 3-ethyl-2-oxazolidone, 3-methoxypropionitrile, dimethylsulfoxide, said electrolyte containing 1 to 10 wt% water and having a room-temperature resistivity of 254 to 584 Ω-cm.

2. A capacitor according to claim 1 wherein said electrolyte comprises 6.47 wt% ammonium anthranilate, 3.33 wt% water, and 90.2 wt% ethylene glycol.

* * * * *